Oct. 3, 1967  W. B. WILKINS  3,345,233
PROCESS FOR MAKING CIRCUMAMBIENT WALL UNIT
Filed Nov. 6, 1963  5 Sheets-Sheet 4

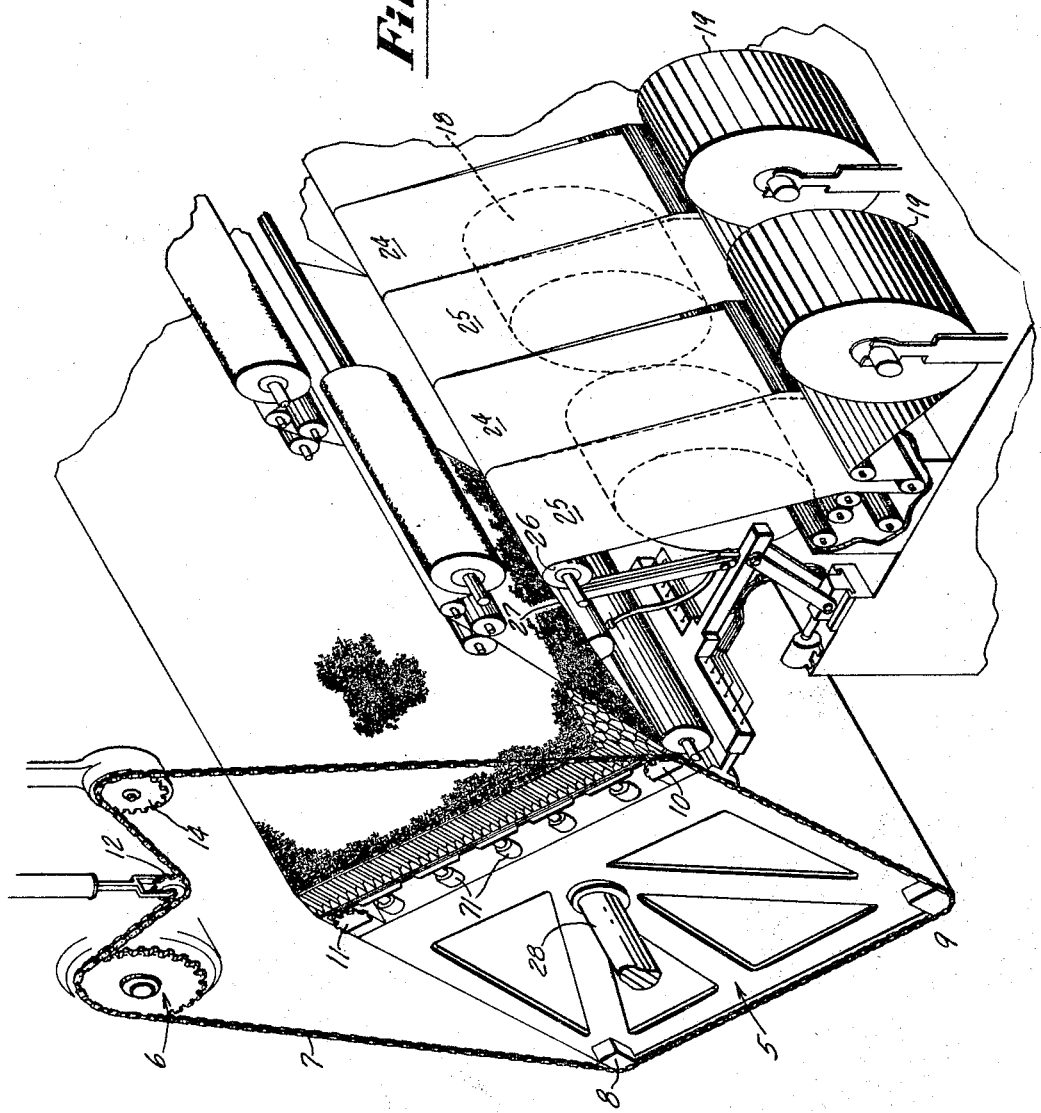

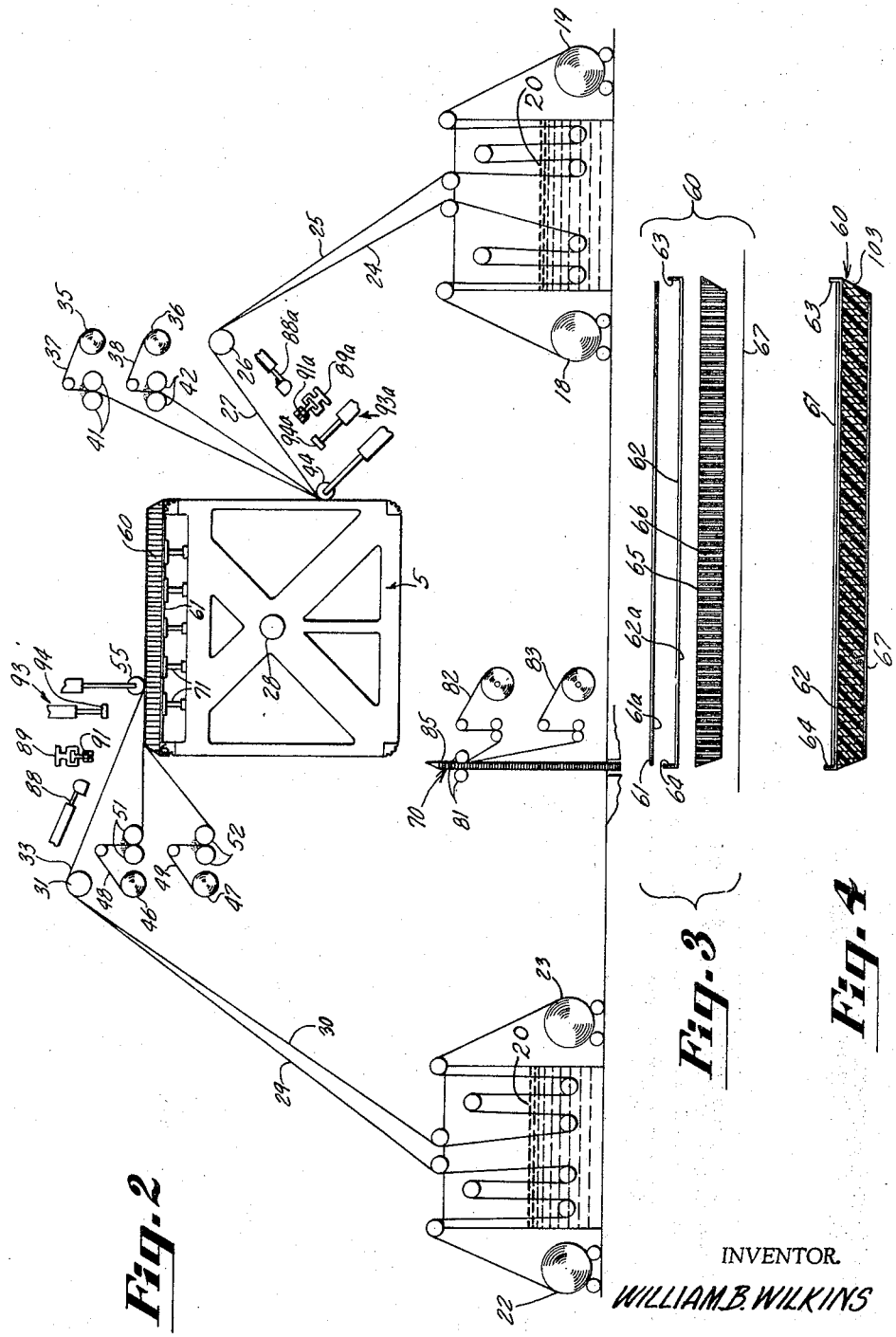

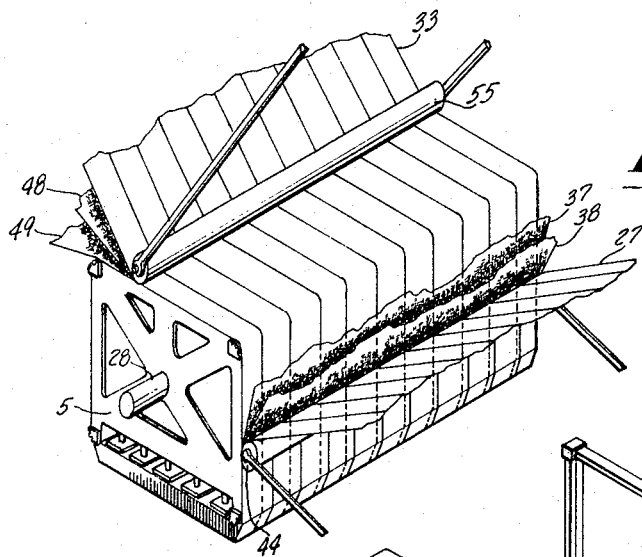
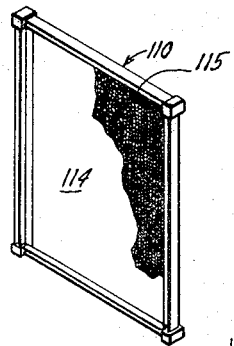
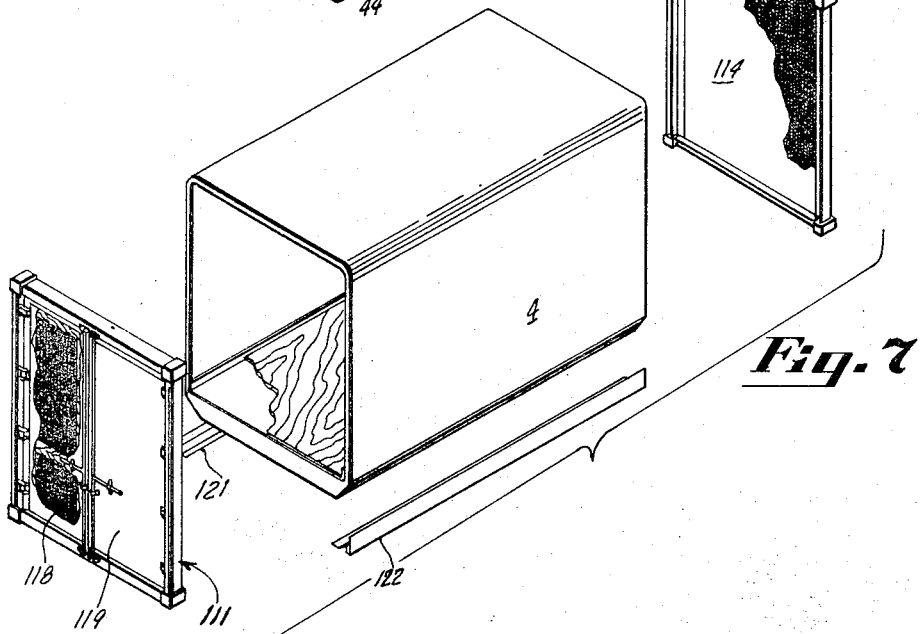

INVENTOR.
WILLIAM B. WILKINS
Henry Kozak
ATTORNEY

Oct. 3, 1967  W. B. WILKINS  3,345,233
PROCESS FOR MAKING CIRCUMAMBIENT WALL UNIT
Filed Nov. 6, 1963  5 Sheets-Sheet 5

INVENTOR.
WILLIAM B. WILKINS
Henry Kozak
ATTORNEY

# United States Patent Office 3,345,233
Patented Oct. 3, 1967

3,345,233
PROCESS FOR MAKING CIRCUMAMBIENT WALL UNIT
William B. Wilkins, Roxboro, N.C., assignor, by mesne assignments, to Midland-Ross Corporation, Cleveland, Ohio, a corporation of Ohio
Filed Nov. 6, 1963, Ser. No. 321,892
8 Claims. (Cl. 156—189)

This invention relates to a method of building circumambient or endless composite wall structures suitable particularly for providing as an integral unit the ceiling, side walls, and the floor support of a cargo container.

An object of the invention is to provide a method of constructing wall structures which avoids assembly procedures of conventional cargo containers or vehicle bodies of frame and panel construction wherein, according to prior art, a frame is initially fabricated as a base to which ceiling, side wall, and floor components are progressively attached.

The present object is to provide an entirely different procedure for forming the floor, side wall and ceiling wall section which makes unnecessary the aforesaid frame and panel construction through the use of a wrapping technique. It is intended that this invention will reduce the duration of manufacturing time for each unit, the man-hours of labor expended per unit, and the cost of the container or other article incorporating the unit.

It is a further object to provide a method of endless wall construction which results in a greater ratio of load-carrying capacity versus container weight.

It is also an object to provide a method for building an endless wall structure which enables diverse preshaped components to be incorporated into the structure at different stages in its formation.

These objects are achieved in a method or process wherein a suitable mandrel or other rotary support and one or more continuous sheets of thin-gauge lamina-forming material is arranged relative to the support to feed there onto in a direction that is convergent with the periphery of the mandrel. Before or after some wrapping has occurred, other wall forming components, such as lamina-spacing panels, adhesives, adhesive carriers, and corner recesses are placed onto the mandrel or on wall-forming components previously placed thereon and wrapped and united into an integrated wall unit. Such unit, in a preferred use, forms the side walls, top wall, or ceiling, and the floor-supporting wall of a cargo container or vehicle body.

In a preferred practice of the method, a mandrel is prepared for a wrapping operation by placing a floor-supporting panel along the floor-forming portion of the mandrel. Two sets of strips, such as a sheet metal, are arranged to feed onto the mandrel with each set of strips arranged in edge-to-edge relation to extend through and form a sheet of such set of strips. Each sheet, in turn, forms one or more laminae when wrapped onto the mandrel. An adhesive, which may be in the form of a continuous fibrous web permeated by, or coated with, a liquid adhesive is fed into the bite or nip of the supply sheet and the mandrel or container component carried thereon. Each sheet, or set of strips, is secured to the mandrel at a stage of mandrel rotation, and to a portion of mandrel, suited to the needs of the process and the location of the storage facilities for the strips relative to the mandrel. The mandrel is rotated to cover the mandrel and the floor-supporting panel with one or more wraps or lamina of each sheet along with the adhesive needed to join all components of the container accumulated on the mandrel.

Panels of laminae-spacing material such as paper honeycomb are placed on or fed into the laminae carried by the mandrel, e.g., on the side wall and top wall portions. Rotation of the mandrel is continued to accumulate additional laminae of the sheet material and adhesive material spread between the interfaces of the adjacent laminae and between the interfaces of the newly incorporated panels and the laminae adjacent thereto. When required as a part of the wall unit, special purpose panels, corner pieces, electric service wires, or tubes are placed on the mandrel and the container components carried thereon and wrapped into the wall unit under later wound laminae at timely stages of the wrapping.

In the drawing with respect to which this invention is described:

FIG. 1 is a fragmentary perspective view of equipment and materials for practising the method of this invention;

FIG. 2 is a schematic perspective view illustrating a mode of supplying various strip and panel materials to a wall unit constructed on the equipment of FIG. 1;

FIG. 3 is an exploded end view illustrating various components of a floor-supporting panel;

FIG. 4 is an end view of the floor-supporting panel in assembled condition;

FIG. 5 is an end view of a side and top wall laminae-separating panel shortened along its top portion;

FIG. 6 is a schematic perspective view of the mandrel and the mode in which strip materials are supplied to the mandrel;

FIG. 7 is an exploded perspective view illustrating various components of a cargo-container utilizing this invention;

Figure 8:
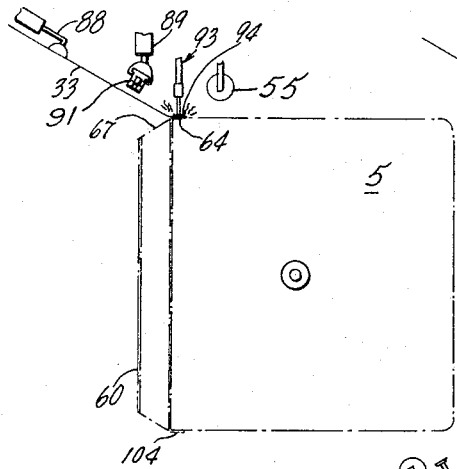
FIG. 8 is a schematic elevation of the mandrel adjacent sheet manipulating fixtures, and a floor-supporting panel attached thereto illustrating the attachment of the leading end of the sheet of wall-forming strips to the panel.

The process according to this invention, except as to certain prefabricated components of the cargo container wall unit, is carried out on an apparatus illustrated in FIGS. 1 and 2. It is in the employment of this apparatus that a wrapping procedure may be followed in which the major components of the wall unit may be assembled and incorporated thereinto during successive stages of winding the major lamina-forming component into the unit. Accordingly, components of an endless or circumambient wall unit 4 (see FIG. 7) are supplied to or fed upon a mandrel 5 (see FIG. 6) supported along a fixed axis and driven from a power source, such as one having a drive sprocket 6 (see FIG. 1) connected in drive relation by a sprocket chain 7 with the mandrel. Driving connection with the mandrel is effected through extension of the chain 7 arounds lugs 8, 9, 10, and 11 located at end-corner positions of the mandrel. These lugs have teeth which mesh with the chain. The drive further comprises a resiliently supported idler pulley 12 adapted for keeping slack out of the chain, and a stationary idler pulley 14. This driving arrangement is designed for maintaining a substantially constant rate of advancement of the periphery of the mandrel, in spite of its non-circular cross section, to effect a substantially constant rate of transfer of the supply sheets thereto.

FIG. 2 is a schematic elevation of the general arrangement of the apparatus for feeding strip sheet material onto the mandrel 5 necessary to the depositing on the mandrel of laminae of wall-forming material together with the sheet-type adhesive applied concurrently with each lamina. FIG. 1 is a perspective view of a portion of the same apparatus which shows feeding apparatus functioning as a source by which one group of alternate laminae are formed on the mandrel.

In a preferred embodiment of the invention, supply rolls of thin gauge sheet steel, e.g., continuous strips of approximately 3-foot width and 0.010 inch thickness, are provided as supply rolls 18 and 19 at the one side of the mandrel, and rolls 22 and 23 at the other side (see FIG. 2). Strips 24 being withdrawn from the rolls 18 are in alternate relation with strips 25 being withdrawn from the rolls 19 through a bath 20 which degreases and otherwise cleans the strips. The strips meet in edge-to-edge relationship on a common roll 26 from which they proceed in parallel relationship as a sheet 27 to the mandrel 5 to form a lamina thereon which has a substantially uninterrupted width extending the full length of the wall unit to be formed on the mandrel. The length of the wall unit is measured in a direction parallel to the axis of rotation of the mandrel. This axis extends lengthwise and centrally of its shaft 28. In a similar manner, the rolls 22 and 23 are withdrawn as pluralities of strips 29 and 30 which merge at a gathering roll 31 into a single sheet 33 of the strips in edge-to-edge relationship. The sheet 33 is then wrapped onto the mandrel or a component carried thereon as shown in FIG. 2.

In practicing the present invention, it is necessary to bond together substantially all components of the wall unit being formed which are juxtaposed to each other in relation to a transverse plane of the mandrel axis or wall unit length. In obtaining good adhesion of the resin with the thin gauge steel strip used as a preferred material, it is necessary to have the steel surface completely free from grease or other foreign material by the degreasing bath shown. As FIG. 2 further illustrates, supply rolls 35 and 36 of continuous strips of fibrous webs are positioned relative to the mandrel and a section of the sheet 27 passing thereunto for being fed into the bite of the mandrel and the sheet. Before contact with an adhesive, it is generally necessary that the sheets 27, 33 reach a dry condition after emerging from the degreasing bath by exposure to the air, or by drying equipment, if necessary. The pluralities of webs or sheets 37 and 38 made, e.g., of glass fibers pass through sets of doctor rolls 41 and 42, respectively, which apply a liquid adhesive, such as a liquid uncured epoxy composition, to the webs. The webs 37 and 38 serve as a vehicle for a liquid adhesive, such as an epoxy composition, and when combined therewith constitute a preferred adhesive agent in practicing this invention.

After passing through the doctor rolls, the coated webs join in edge-to-edge relationship into a single web or adhesive member having a width substantially that of the sheet 27 as the webs 37 and 38 pass under a pressure roll 44 which firmly presses the sheet 27 against the exterior of the mandrel and components thereon.

In a similar way, supply rolls 46 and 47 provide webs 48 and 49, respectively, which pass through doctor rolls 51 and 52, respectively, to form an adhesive membrane entering the bite of the mandrel 5 and the sheet 33 for the purpose of bonding the sheet 33 to an underlying component of the wall unit 4 (see FIG. 7) previously applied to the mandrel 5. The sheet 33 and the adhesive web discharged by the doctor rolls is joined with an underlying component in the same manner as described with respect to sheet 27. That is to say, the sheet 33 and the web pass into the nip of a pressure roll 55 and the container component carried on the mandrel.

Although the basic wall-forming wrapping procedure may be practiced for circumambient wall structures other than those of cargo-containers, construction of a container wall unit is herein further disclosed as including, as a step previous to any wrapping operation, the provision of a floor-supporting component which, when prefabricated, may then be included in the wrapping procedure at a proper stage. A floor-supporting inlay panel 60 is shown in assembled condition in FIG. 4 and in exploded condition in FIG. 3. With respect to its usual position in the container, the panel 60 comprises, in a preferred form, an upper planate steel sheet 61, another steel sheet 62 with turned-up edges 63 and 64, a honey-comb slab 65 formed, e.g., of resin-impregnated paper material, a cured resinous-foam material which fills the cells of the honey-comb slab derived, e.g., by urethane foam-resin compositions known to the art, and a porous paper sheet 67 normally adhered to inclined side and bottom surfaces of the slab 65, as shown in FIG. 4.

As usual procedure, the panel 60 is constructed in an upside-down orientation on a mold or work table. That is to say, the first part to be placed on the table is the upper sheet 61 with its undersurface 61a coated with adhesive and facing upwardly. The sheet 62 is then placed over the sheet 61 with its undersurface 62a now facing upwardly, having been previously coated with a foamable resinous liquid composition mixed for foaming within a few minutes. Next applied is the slab 65 received by the undersurface 62a covered with the foamable material. At this stage, the undersurface 66 of the slab 65 faces upwardly with its honey-comb cells opening upwardly. Before this material can start foaming, the slab is covered with the porous paper sheet 67, and a conforming platen is brought downward against the undersurface of the sheet 67 to maintain the panel components in tight relationship while awaiting the curing of the liquid adhesive material, and foaming and curing of the foamable composition. During this period, the foamable composition foams to expel air through the porous paper 67 and bond therewith. During the press operation, the foamable material and the adhesive materials substantially cure to effect complete bonding of the paper, the slab, and the steel sheet 62 into an integral unit.

In practice, it is desirable to form the panel 60 just described in a factory location which is slightly elevated and longitudinally offset with respect to the upper peripheral portion of the mandrel 5. This permits the panel 60 to be moved from its final assembly and pressing operation in upsidedown position along a horizontal endwise path into position over a plurality of suction cups 71 (see FIG. 2) of the mandrel. The suction cups face outwardly in a plane along one portion of the periphery of the mandrel and are operative and normally face upwardly when the cups engage the smooth metallic surface of the sheet 61 during placement of the assembled panel 60 shown in FIG. 4. The cups 71 are energized, i.e., subjected to vacuum, by a vacuum system (not shown) carried on the mandrel which may include a motor and vacuum pump arranged, energized and controlled in a conventional manner.

Before the various components of a cargo container wall may be wrapped into place on the mandrel 5, another panel 70 must be assembled. This panel, although constructed while disposed in a plane, is shown vertically shortened in FIG. 5 and folded in U-shape as when contained within the sides and the top of the container. For simplicity of description, the components of the panel 70 may be considered to consist of an outer metal sheet 73, a honey-comb slab 74, and three metal sheets, 75, 76, 77, and wood blocks 78 and 79. For simplicity of description, each component just named will be considered to have a length equal to that of the container or trailer body being constructed although, as practical matter, each component, particularly the honey-comb slab and the metal sheets, are normally furnished in standard widths that are but a minor fraction of the length of the container as ordinarily constructed in practicing this invention, e.g., a length of 40 feet, and will consequently comprise a plurality of smaller pieces in edge-to-edge relationship.

The panel 70 may be assembled, for example, by spreading some solid to liquid resinous adhesive composition on one side of the sheet 73 and placing it with the adhesive coated side up on an assembling table, placing the honey-comb slab 74 over the sheet 73, then coating one side each of the sheets 75, 76, and 77 with the adhesive composition and placing them on the slab 74 with the coated sides in contact with the slab. Wood blocks or wedges 78 and 79 are also bonded to wedge surfaces of the honey-comb material in the arrangement illustrated by FIG. 5. As shown in FIG. 5, the steel sheets 73, 75, and 77 extend over or overlap the wedge sides of the wedge shaped blocks 78 and 79.

While FIG. 5 illustrates panel 70 as folded in order to allow the use of a compact figure, the panel will ordinarily be conveyed or led into the bite of the mandrel 5 and the adhesive sheets 48 and 49 by a propulsion device such as the rolls 81 (FIG. 2) in unfolded condition. The rolls 81 have the further function of applying fibrous web and resin sheets 82 and 83 as a single layer of adhesive agent to the side 85 of the panel 70 facing inwardly toward the mandrel. As the panel 70 is wrapped into the container wall being formed on the mandrel, the adhesive sheets are applied to the outer surface of the panel 70, i.e., the surface facing away from the mandrel, thereafter becomes covered with the steel lamina 33.

The foregoing text describes, in general, the apparatus and preparation of the fabricated components to be used in the circumambient container wall unit. The wrapping procedure to be described is facilitated by certain auxiliary equipment supported adjacent the mandrel for performing operations on the laminae 27 and 33 which precede and follow actual wrapping. For example, it is necessary to hold the leading ends of the laminae-forming sheets 27 and 33 after severance from the portions thereof wrapped on the mandrel to form a wall unit. For this purpose, a vacuum gripper 88 is provided which extends the full width of the sheet 33 and is capable of gripping the individual strips forming the sheet 33. In the same manner the free end of the sheet 27 may be held by a vacuum gripper 88a. The vacuum gripper is supported in such a manner as to enable the vacuum head thereof to be movable longitudinally of the path of the sheet so that the leading end of the sheet may be adjusted along the path when, for example, it is necessary to bring the leading ends of the sheet into contact with the area of the floor-supporting panel to which it is attached.

It is also necessary to be able to cut the sheets 27 and 33 in a precise manner. For this purpose, cutters 89 and 89a are provided which have cutting heads 91 and 91a, respectively. Each head may be retracted by means such as the fluid-operated cylinder shown, out of the regions traversed by the sheet 27 or 33. One preferred type of cutting device is that which has a track aligned transversely of the sheet length and a cutting head which is propelled along the track. The head comprises one jaw of bifurcated construction and another jaw which reciprocates through the plane of the sheet and between the legs of the other jaw to displace small, elongate, rectangular pieces of metal from the sheet as it progresses crosswise thereof.

Important from the standpoint of practical execution of the invention is the attachment of the leading ends of the primary laminae-forming material of the wall unit. In the practice of this invention, the leading end of the sheets 27 and 33 are attached to a component of the container already in place on the mandrel 5. The present invention makes use of the fact that an epoxy composition or other adhesive of substantial strength and similar curing rate may be temporarily heated to accelerate its curing period to a matter of seconds. Accordingly, the practice of this invention is facilitated by provision of a sealing device comprising a heatable bar or platen 94 which may be moved by means such as a fluid cylinder 93 into and out of the region traversed by the periphery of the mandrel 5 when attaching the sheet 33 to the panel 60. Another similar device for attaching the sheet 27 comprises the platen 94a and the cylinder 93a.

Each sheet 27, 33 must be firmly pressed to the underlying material on the mandrel in order to squeeze out all the air which might interfere with the bonding of adjacent lamina by the resin-bearing fibrous web fed onto the mandrel into underlying relation with the sheets 27 and 33. Pressure rolls 44 and 55 are provided for this purpose on separate mountings which, during operation, urge the rolls against material carried on the periphery of the mandrel but permit the rolls to move toward and away from such axis in accordance with the varying radial distance of the mandrel perimeter being contacted by either roll as the mandrel rotates In using adhesives of the thermosetting and curing types as disclosed, desired curing rates are obtained by adjusting the temperature of the adhesive, such as that of the resin-bearing webs disclosed, and the container components, such as sheets 27 and 33 in contact with the adhesive, contemporaneously with pressing of the components against the mandrel as described above to cure a curable portion of the adhesive and thus affix the components to each other.

Figure 9:
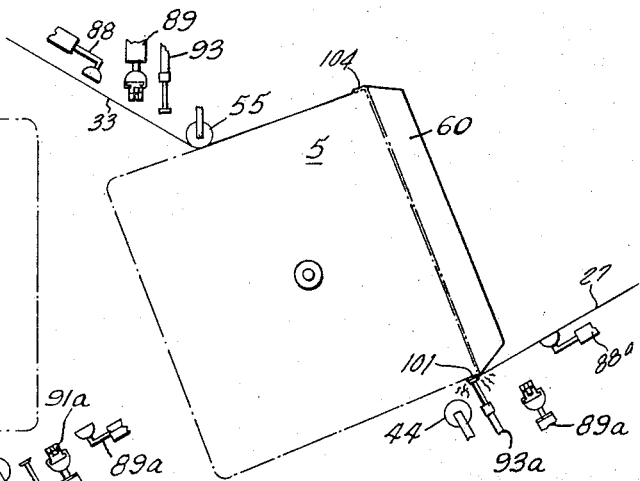
FIG. 9 is a schematic elevation of a later stage in the wrapping process wherein a second sheet is attached to the panel.

To start the wrapping process, the mandrel 5 is positioned somewhat as shown in FIG. 2 to enable placement of the panel 60 over the vacuum cups 71. With the panel 60 in place on the mandrel, valves are opened between the vacuum cups and a vacuum generating system (not shown) to secure the panel in its proper position on the mandrel. The mandrel is back-rotated (counterclockwise) about 90° with respect to its normal direction of rotation to the position shown in FIG. 8. By manipulation of the sheet-gripping device 88, the leading edge of the sheet is adjusted over the flange 64 of the unit 60 which has just previously received a coating of thermosetting adhesive. The sealing device 93 is then operated to place the heating bar thereof over the leading edge of the sheet 33 for a period, such as 3 to 5 minutes, sufficient to secure the sheet to the flange 64. With the sheet thus secured, the heater bar 94 may be retracted and the suction device deactivated to release it from the sheet 33. Rotation of the mandrel continues for about 115° to the position shown in FIG. 9, whereupon the leading end of the sheet 27 is attached approximately over, or to, the leading end of the sheet 33. In order to avoid adherence of sheet 33 to the mandrel, adhesive webs 48 and 49 are not attached to assembly being wrapped until the mandrel has made approximately one full turn from the position of FIG. 8.

Figure 10:
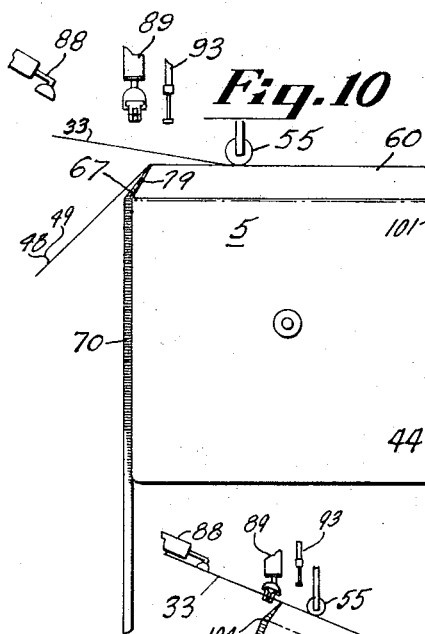
FIG. 10 is a schematic elevation of a still later stage of the process wherein the mandrel has received a laminae-spacing panel and two laminae are being applied simultaneously.
Figure 11:
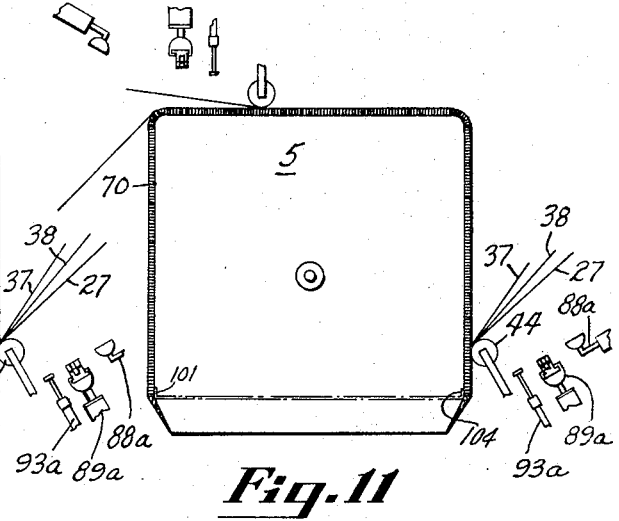
FIG. 11 is a schematic elevation illustrating a more advanced stage of the process wherein the floor-supporting panel and the side wall and ceiling lamina separating panel have been wrapped into place by overlying laminae.

Wrapping now proceeds with the laying on of both sheets 27, 33 and associated adhesive webs 37 and 38 between sheets 27 and 33 simultaneously until the mandrel is approximately positioned as shown in FIG. 10. Then, the adhesive-laden fibrous webs 48 and 49 are placed into the bite formed by the sheet 33 and the panel 60 and secured therein by a slight rotation of the mandrel. At slightly further rotation which places the mandrel in the position of FIG. 10, the mandrel has been rotated as depicted in FIG. 6, through at least 320° from the position of FIG. 9 to wrap two laminae upon the mandrel, i.e., one lamina from each of the sheets 27 and 33.

When the mandrel is enclosed by two wrapped-on laminae of metal, the laminae spacing panel 70 is brought into position for being wrapped into the wall unit, as shown in FIG. 10. The panel 70 is adjusted along the mandrel and material wrapped thereon to dispose the wedge 79 thereof along the paper side surface 67 of the panel 60. With the leading edge of the panel 70 thus gripped in the bite defined by the surface 67 and the sheet 33 together with its resin and fiber adhesive layer, the accumulation of material on the mandrel is continued by sufficient rotation of the mandrel to accumulate thereon at least two more laminae from the metal sheets 27, 33. Cutting may be performed on either sheet by respective cutters 89 and 89a at any desired stage of mandrel rotation. The purposes of this invention are served satisfactorily by cutting each sheet after a complete wrap thereof about the panel 70 has been made.

Figure 12:
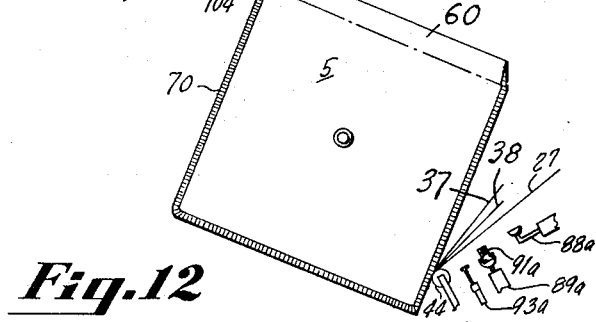
FIG. 12 is a schematic elevation illustrating the wrapping process at a stage nearing completion wherein the first attached sheet is severed from the wall unit.

To build in greater beam strength in the floor-supporting portion of the container independently of the beam strength of the container in its entirety, wrapping may be continued to the point of laying extra plies of sheets 27, 33 over the bottom of the container wall unit. For example, wrapping in the present instance commenced on each sheet 27, 33 at one lateral extremity of the panel 60. Wrapping then proceeded in the direction of rotation which laid each sheet 27, 33 over the floor-supporting panel 60. In a wrapping procedure limited to 4 wraps only, each sheet would be cut approximately at the point along the mandrel perimeter at which the sheet was initially attached. Each sheet would thus be wrapped twice around the mandrel to obtain four laminae. In the present instance, it is preferred to continue wrapping through approximately an additional quarter turn for each sheet in order to place an extra ply over the panel 60 and to delay cutting of the sheet until the container corner 104 has passed a third time under each cutter 89 or 89a. For example, FIG. 12 illustrates a stage of operation wherein the mandrel 5 is stopped, the vacuum gripper 88 has been engaged with the sheet 33 to hold it while being cut by the device 89. The sheet is then received in the cutting head 91 of the device. It will be apparent from FIG. 12, that after cutting the sheet 33, the sheet 27 will be cut as the corner 104 of the container is rotated to a position just past the cutting head 91a of the device 89a.

After the sheet 27 or 33 is cut in each case, the heating bar of the adjacent sealer 93 or 93a is placed against the trailing end of the respective lamina and is sealed in a matter of 3 or 5 minutes against the underlying lamina or other material.

With all auxiliary material retracted, e.g., pressure rolls, heating bars, and vacuum grippers, the vacuum grippers 71 of the mandrel 5 are released and retracted from the position thereof in supporting panel 60. The unit may now be removed in its endwise direction from the mandrel.

Figure 13:
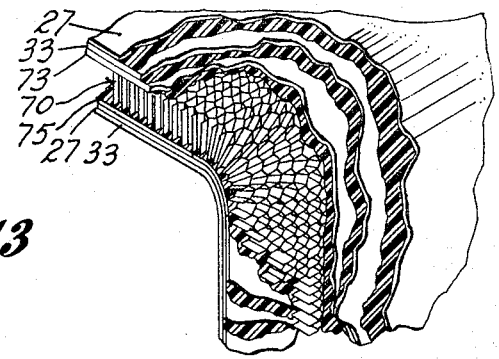
FIG. 13 is a fragmentary perspective view of a corner portion of the wall unit shown in the preceding figures with portions broken away to show its cross section.

FIG. 13 is illustrative of the manner in which the laminae-separating panel 70 must be formed in being wrapped around underlying laminae previously wrapped on the mandrel. It is for this reason that the sheets 75, 76, 77 are separated at the inner corners of the panels, as shown in FIG. 5 to allow the honey-comb material of the panel to crush along the inner periphery of the panel as it extends around the sharp corners formed by the two inner laminae of the container wall unit.

Figure 15:
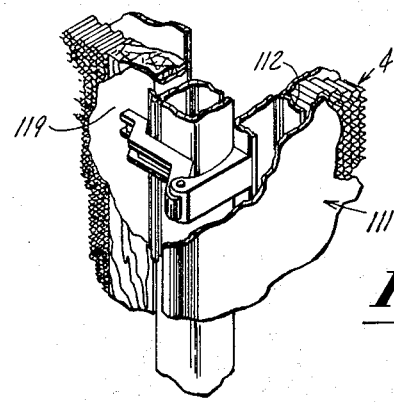
FIG. 15 is a fragmentary perspective view showing the wall unit connected with a door frame and a door hinged to the frame.
Figure 16:
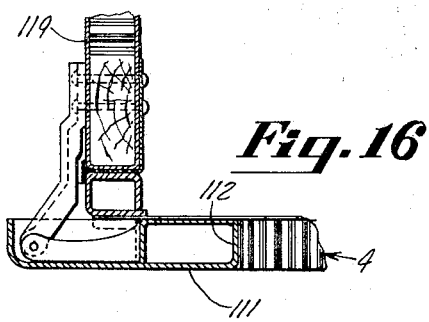
FIG. 16 is a fragmentary plan view in section of the portion of the container shown in FIG. 15.

While this invention is directed primarily to the unit 4, FIGS. 7 and 15 illustrate container components which may be added to the unit to complete the container as, e.g., when the components of FIG. 7 are assembled. Typical of end frames which may be attached to end edges of the unit 4 is a blind end frame 110 and a door frame 111. Both frames are recessed in the manner shown in FIG. 15 at 112 to receive marginal edge portions of the unit 4. The frames and the unit 4 are bonded by high strength resin adhesive, such as a liquid epoxy composition. The frame 110 supports an end wall 114 attached thereto showing its metal skin broken away to expose the honey-comb material 115 disposed in the manner of a sandwich filling to space outer and inner metal laminae somewhat as found in the side and top walls of the unit 4. The frame 111 supports a pair of doors 118, 119 (see FIG. 1) hinged to the frame in the manner shown in FIG. 15 respecting door 119. The doors may comprise the sheet metal and honey-comb slab sandwich construction described with respect to the wall 114 and the unit 4.

Figure 14:
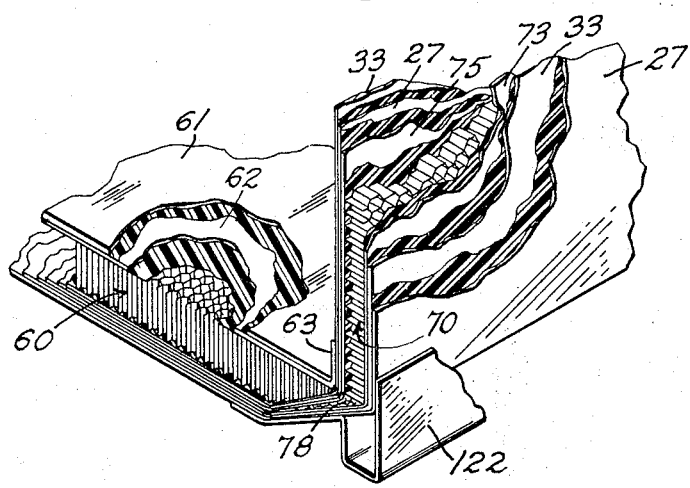
FIG. 14 is a perspective view of a lower corner section of the wall unit with portions broken away to show the internal structure of the unit.

The container further comprises a pair of rub rails 121 and 122 attached along the bottom of the unit 4 lengthwise of opposite bottom dihedral sections or corners of the container. The upward extending flanges of the rails are disposed just outside the wedges 78 and 79 of the panel 70 (e.g., see wedge 78 and the rail 122 of FIG. 14) and metal laminae extending thereover. The horizontally extending webs of the rub rails are secured to the underside of the wall unit 4. Preferably, the rub rails 121, 122 are joined to adjacent lower corners of the frames 110 and 111 as by welding to effectively unite the rigid metal components of the container and to further insure against any separation of the frames from the wall unit 4.

The above describes in general the mode of manufacturing a cargo container. More specifically disclosed is a process for manufacturing a wall unit therefor of endless construction. The term "container" is intended to include or be equivalent to such receptacles as cargo containers, truck bodies, shelters, or other protective structure wherein the wall unit would be of use.

The terms and expressions which have been employed are used as terms of description and not of limitation and there is no intention of excluding such equivalents of the invention described or of the portions thereof as fall within the purview of the claims.

What is claimed is:
1. A method of making a circumambient wall unit, the steps of which comprise:
 (A) providing a rotary support arranged with its peripheral surrounding an axis of rotation for the support;
 (B) providing and arranging a continuous supply of thin gauge flexible wall-forming sheet material for feeding onto the support in a direction converging therewith;
 (C) attaching an end portion of the sheet material to the support;
 (D) placing a first panel of laminae-spacing material along a first portion of the periphery of said support;
 (E) rotating the support to wind said sheet material over the panel;
 (F) placing a second panel of laminae-spacing material over the wrapped sheet material along a different portion of said periphery;
 (G) continuing the rotation of the support to wrap said sheet material along the entirety of said periphery and to bind said sheet material and panels into an integral wall unit;
 (H) progressively applying an adhesive to substantially all interfaces of said sheet material and panels during the foregoing steps as opposed interfaces are brought into superimposed relationship on the mandrel;
 (I) severing said sheet material wrapped into said unit with respect to said supply and securing the end portion of the sheet material to the underlying lamina or other component of the unit;

(J) bonding substantially all of the above-named components of said unit together with said adhesive; and
(K) removing said unit from the support.

2. A method of building a cargo container, the steps of which comprise:
(A) providing a rotary mandrel shaped to a desired inner contour of the container;
(B) constructing a floor-supporting inlay panel to a length substantially that of the container to be constructed and of a width which is approximately that of the floor desired;
(C) placing the panel on a floor-building portion of the mandrel with its length aligned lengthwise of the mandrel axis;
(D) attaching a sheet material to the assembly comprising the mandrel and the panel from a supply thereof located for feeding said material onto the mandrel and the panel in a direction converging therewith;
(E) rotating the mandrel to accumulate laminae of said material entirely encircling said assembly and the panel to an extent conforming substantially to the length of the container;
(F) placing over said laminae, except for that supported by the panel, a substantially rigid laminae-spacing material;
(G) continuing the rotation of the mandrel to accumulate additional sheet material over all portions of the spacing material and the sheet material supported by the panel;
(H) applying an adhesive material during the foregoing steps to all of said container components which have an inner face with another of said components; and
(I) bonding all of said components together with said adhesive material and removing the unit from the mandrel.

3. A method of making a circumambient wall unit, the steps of which comprise:
(A) providing a rotary support arranged with its periphery surrounding an axis of rotation for the support;
(B) providing and arranging a continuous supply of two sets of sheet material with the sheets of each set arranged to be wrapped about the periphery of the support in edge-to-edge relationship and the adjacent edges of adjacent sheets in one set being offset with respect to any pair of adjacent edges in the second set;
(C) attaching the sheets of both sets to the support;
(D) rotating the support to draw said sheets thereonto;
(E) placing a first panel of laminae-spacing material along a first portion of the periphery of the support;
(F) rotating the support to cover said panel and at least another portion of said periphery with laminae of said sheets;
(G) placing a second panel of laminae-spacing material over said laminae along said other peripheral portion;
(H) continuing the rotation of the support to wrap said sheets along the entirety of said periphery and to bind said sheets and panels into an integral wall unit;
(I) applying an adhesive to substantially all interfaces of said sheets and panels during the foregoing steps;
(J) bonding substantially all above-named components of said unit by said adhesive; and
(K) removing said unit from the support.

4. A method of building a wall unit of a cargo container, the steps of which comprise:
(A) providing a rotary mandrel shaped to a desired inner contour of a container;
(B) constructing a floor-supporting inlay panel to a length substantially of that of the container to be constructed and of a width which approximates that of the floor;
(C) placing the panel on a floor-building portion of the mandrel with its length aligned lengthwise of the mandrel axis;
(D) providing a supply of a first set of strips of thin gauge flexible wall-forming material, arranging them in edge-to-edge parallel relationship, and attaching the strips to the assembly comprising the mandrel and the panel for feeding the strips thereonto as a single sheet;
(E) providing a supply of a second set of thin-engaged flexible wall-forming strips and arranging them in edge-to-edge parallel relationship with the edges thereof offset with respect to any pair of adjacent edges of the first set in a direction parallel to the mandrel axis, and attaching a second set of strips to said assembly for feeding them thereunto as a single sheet;
(F) rotating the mandrel to accumulate wraps of both sheets to dispose the strips of adjacent laminae in staggered relationship;
(G) placing over said laminae, except for a portion thereof supported by said panel, a second panel of substantially rigid spacing material;
(H) continuing the rotation of the mandrel to wrap on additional laminae formed from both sheets over all portions of the spacing material and portions of previously wrapped laminae supported by the panel;
(I) applying an adhesive material during the foregoing steps to all innerfaces of said laminae, panel, and spacing material and bonding said components into an integral wall unit; and
(J) removing said unit from the mandrel.

5. The method of claim 4 wherein:
the application of the adhesive material comprises spreading a liquid adhesive onto a continuous fibrous web, feeding the web into the bite formed by each sheet with mandrel-supported container components; and
pressing the sheets firmly against the web and the underlying component of the container to force the adhesive to permeate the web and establish adhesive relation with said sheets and the underlying component.

6. The method of claim 4 wherein:
the sheets are provided of metal; and
the application of the adhesive comprises spreading a liquid uncured epoxy composition on a continuous web of glass fibers;
feeding the adhesive-bearing web into the bite of each sheet and mandrel-supported container components; and
pressing the sheets firmly against the web after the sheets and the web are wrapped into place over a mandrel-supported container component to effect permeation of the web by the adhesive and substantial bonding of the adhesive with said sheets and the container component underlying the web; and
adjusting the temperature of the adhesive and container components in contact therewith contemporaneously with said pressing to cure said composition and thereby affix components firmly to each other.

7. The method of claim 4 wherein:
the sheets are provided of light gauge steel, the panels are constructed by providing slabs of honeycomb material having cells aligned parallel to the panel thickness;
bonding thin gauge steel sheets to one face of the slabs by an adhesive material;
supplying said first panel with its steel sheet facing toward the mandrel during said step of placing the panel on the mandrel and then later bonding marginal edge portions of the panel sheet which extend lengthwise of the mandrel to initial wraps of the steel sheets with adhesive material;

constructing the second panel of at least one slab of a paper honey-comb material having the lengths of its cells parallel to its thickness;

bonding a thin gauge steel sheet to one side of the slab with adhesive material;

placing the second panel on the mandrel and any container component carried thereon with said thin gauge sheet on the side of the panel outward from the mandrel;

applying the adhesive material by spreading a liquid adhesive onto a continuous fibrous web and feeding the web into the bite of each set of sheets and the second panel with mandrel-supported container component; and pressing the sheets and the second panel against any underlying component of the container to effect permeation of the web by the liquid adhesive and contact of the latter with the interfaces of the container components at each side of the web.

8. The method of claim 7 comprising:

passing the metal sheets through a degreasing bath and then drying the sheets before contact with said adhesive carrying web.

References Cited
UNITED STATES PATENTS

| | | | |
|---|---|---|---|
| 2,008,906 | 7/1935 | Ginsberg | 229—3.5 |
| 2,221,006 | 11/1940 | Romanoff | 156—191 X |
| 2,388,541 | 11/1945 | Henderson | 156—189 |
| 2,917,217 | 12/1959 | Sisson | 229—3.5 |

EARL M. BERGERT, *Primary Examiner.*

PHILIP DIER, *Examiner.*